US012585637B1

(12) United States Patent
Adams et al.

(10) Patent No.: US 12,585,637 B1
(45) Date of Patent: Mar. 24, 2026

(54) BULK MODIFICATION OF CLUSTER CONFIGURATIONS AND SYSTEMS AND METHODS OF THE SAME

(71) Applicant: T-Mobile USA, Inc., Bellevue, WA (US)

(72) Inventors: Scott Clifford Adams, Atlanta, GA (US); Alec Tyler Griffin, Frisco, TX (US); Justin Carl Hopper, Maple Valley, WA (US); Mary Anna Larrousse, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 18/893,842

(22) Filed: Sep. 23, 2024

(51) Int. Cl.
G06F 16/00 (2019.01)
G06F 16/23 (2019.01)
G06F 16/28 (2019.01)

(52) U.S. Cl.
CPC ........ *G06F 16/2386* (2019.01); *G06F 16/285* (2019.01)

(58) Field of Classification Search
CPC ..... H04L 63/10; H04L 67/06; H04L 67/1097; H04L 67/34; H04L 9/0643; H04L 9/0819; H04L 9/0891; H04L 9/0894; H04L 9/3226; H04L 41/0869; H04L 63/102; H04L 41/0806; H04L 41/0843; H04L 41/0893; H04L 41/40; H04L 45/586; H04L 67/10; H04L 67/02; H04L 41/22; H04L 67/133; H04L 67/561; G06F 8/71; G06F 8/20; G06F 8/60; G06F 8/73; G06F 8/75; G06F 9/451; G06F 2009/4557; G06F 2009/45595; G06F 9/45558; G06F 9/54; G06F 9/541; G06F 8/30; G06F 9/547; G06F 9/546; G06F 16/212; G06F 16/254; G06F 8/34; G06F 8/36; G06F 9/465; G06N 20/20; G06N 3/045; G06N 3/08

See application file for complete search history.

(56) References Cited

U.S. PATENT DOCUMENTS

| | | | |
|---|---|---|---|
| 7,376,724 B2 | 5/2008 | Goyal et al. | |
| 9,734,155 B2 | 8/2017 | Heemskerk et al. | |
| 11,194,791 B1 | 12/2021 | Baine et al. | |
| 11,516,015 B2 * | 11/2022 | Sanders | H04L 9/0894 |

(Continued)

FOREIGN PATENT DOCUMENTS

| | | |
|---|---|---|
| CN | 111417939 A | 7/2020 |
| EP | 3049969 A2 | 8/2016 |

(Continued)

*Primary Examiner* — Shyue Jiunn Hwa
(74) *Attorney, Agent, or Firm* — Perkins Coie LLP

(57) ABSTRACT

Systems and methods for bulk modification of cluster configurations are disclosed herein. The system can receive a cluster modification request. The system can identify a set of cluster identifiers using a received indication of target clusters. The system can, for each particular cluster identifier, retrieve an associated repository identifier, an associated configuration file, and associated cluster configuration data. The system can generate a modified configuration file using the retrieved configuration file. The system can store the modified configuration file in an associated repository. The system can transmit a request to the repository to modify an existing control plane node configuration of a target cluster.

20 Claims, 6 Drawing Sheets

(56)     References Cited

U.S. PATENT DOCUMENTS

| | | | |
|---|---|---|---|
| 11,526,464 | B2 | 12/2022 | Gandhi |
| 2006/0037016 | A1* | 2/2006 | Saha ......................... G06F 8/61 |
| | | | 717/178 |
| 2021/0255917 | A1* | 8/2021 | Reitbauer ........... G06F 11/3409 |
| 2022/0131865 | A1* | 4/2022 | Lev Ran ............... H04L 63/102 |
| 2022/0337417 | A1* | 10/2022 | Sanders .................. H04L 67/34 |
| 2023/0022226 | A1 | 1/2023 | Pissay Srinivasa Rao et al. |
| 2023/0206329 | A1* | 6/2023 | Cella .................. G06Q 20/0855 |
| 2023/0214925 | A1* | 7/2023 | Cella ...................... G06Q 30/06 |
| | | | 705/37 |
| 2024/0007492 | A1* | 1/2024 | Shen ................... H04L 63/1425 |
| 2024/0028590 | A1* | 1/2024 | Richter ............ G06F 16/24532 |

FOREIGN PATENT DOCUMENTS

| | | | |
|---|---|---|---|
| JP | 2007507760 | A | 3/2007 |
| JP | 6678167 | B2 | 3/2020 |

* cited by examiner

300

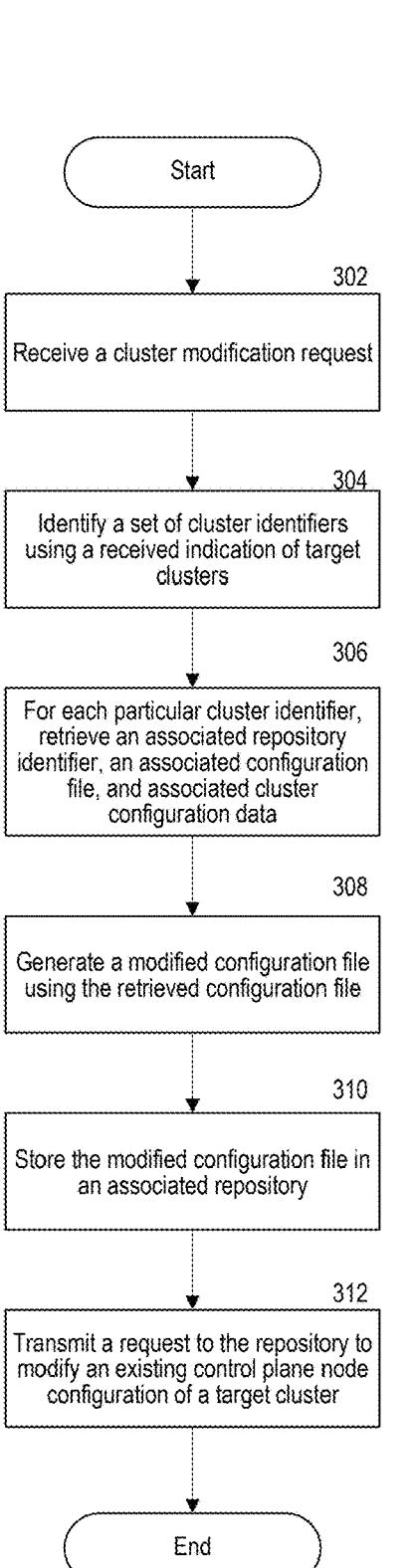

Start

302

Receive a cluster modification request

304

Identify a set of cluster identifiers using a received indication of target clusters

306

For each particular cluster identifier, retrieve an associated repository identifier, an associated configuration file, and associated cluster configuration data

308

Generate a modified configuration file using the retrieved configuration file

310

Store the modified configuration file in an associated repository

312

Transmit a request to the repository to modify an existing control plane node configuration of a target cluster End

BULK MODIFICATION OF CLUSTER CONFIGURATIONS AND SYSTEMS AND METHODS OF THE SAME

BACKGROUND

Container orchestration automates the provisioning, deployment, networking, scaling, availability, and lifecycle management of containers. Today, Kubernetes is the most popular container orchestration platform, and most leading public cloud providers offer managed Kubernetes services. Kubernetes is an open-source container orchestration system for automating software deployment, scaling, and management. Kubernetes works with "containerd," and CRI-O. Kubernetes defines a set of building blocks ("primitives") that collectively provide mechanisms that deploy, maintain, and scale applications based on central processing unit (CPU), memory or custom metrics. Kubernetes is loosely coupled and extensible to meet different workloads. The internal components as well as extensions and containers that run on Kubernetes rely on the Kubernetes application programming interface (API). The platform exerts its control over computing and storage resources by defining resources as objects, which can then be managed as such.

Kubernetes follows the primary/replica architecture. The components of Kubernetes can be divided into those that manage an individual node and those that are part of a control plane. A Kubernetes master node handles the Kubernetes control plane of the cluster, managing its workload and directing communication across the system. The Kubernetes control plane consists of various components, each its own process, that can run both on a single master node or on multiple masters supporting high-availability clusters.

BRIEF DESCRIPTION OF THE DRAWINGS

Detailed descriptions of implementations of the present invention will be described and explained through the use of the accompanying drawings.

FIG. 3 is a flowchart that illustrates a process for modifying cluster configurations in bulk in response to a cluster modification request.

Figure 1:
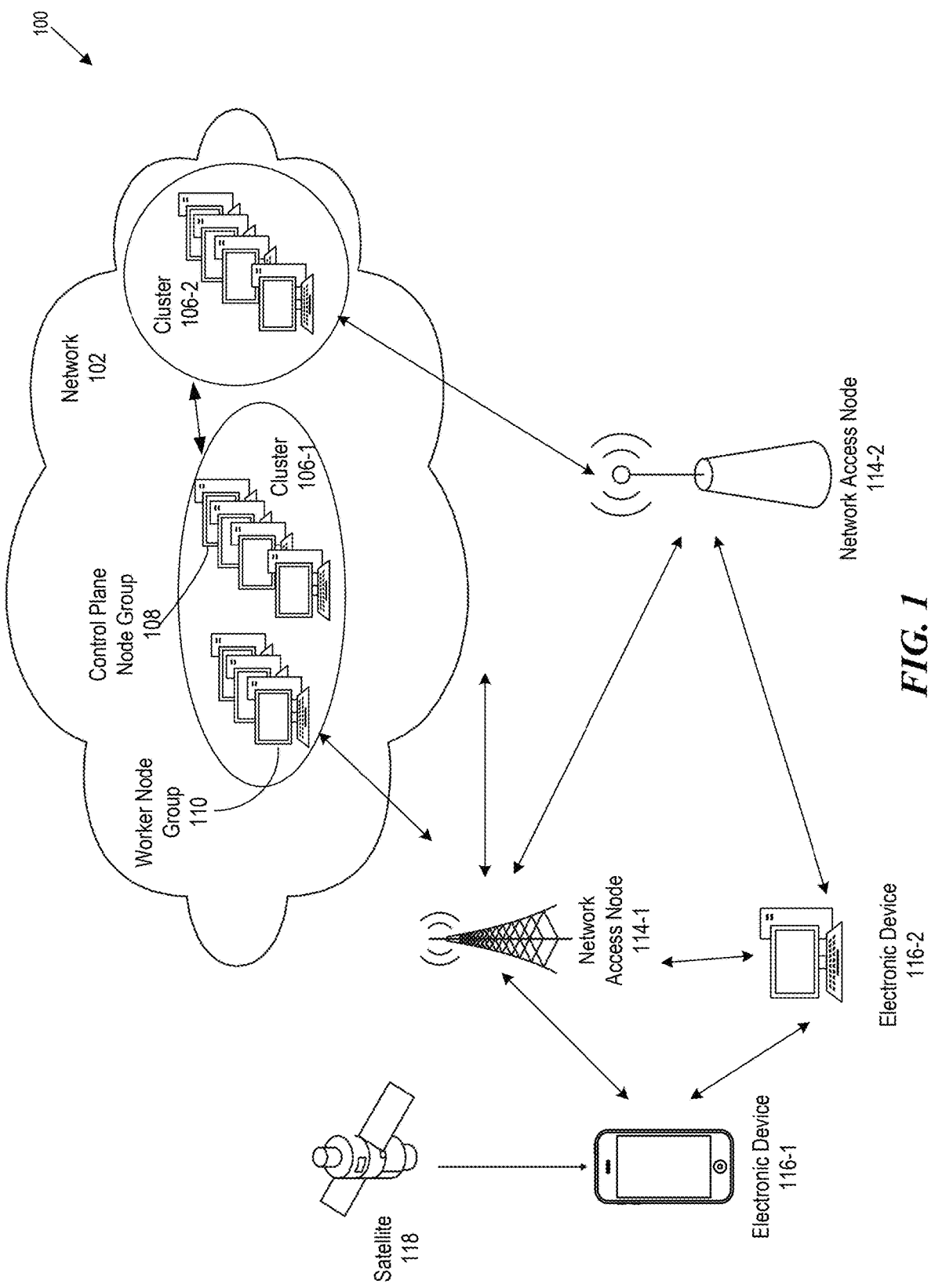
FIG. 1 is a schematic illustrating a network capable of communicating with electronic devices and Kubernetes clusters.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Modular container orchestration systems, such as Kubernetes-based clusters, enable flexible, efficient, hardware-agnostic manners in which to deploy features and functions associated with a computational system. For example, Kubernetes-based clusters can provide microservices in a manner that is portable across cloud providers and hardware, thereby enabling improved flexibility and modularity over other pre-existing architectures. However, due to their customizable and modular nature, systems or networks that utilize multiple Kubernetes clusters can be susceptible to difficulties during maintenance, updates, and scaling. For example, different clusters within a given system can exhibit different features, versions, components, databases, or functions, thereby requiring cluster-specific use and maintenance.

In some cases, repositories can improve the efficiency of updates and modifications to clusters, such as Kubernetes clusters. For example, repositories enable clusters to include features that enable additions, modifications, hierarchy management, searching, versioning, access control, and life cycle management. However, such repositories are specific to the features and components associated with a given system (e.g., a cluster). For example, a first repository includes information relating to changes, versions, or functions associated with a specific cluster, while a second repository can include analogous, yet different, information for another cluster.

As such, in situations where multiple clusters are to be modified simultaneously, pre-existing systems require bespoke, cluster-specific modifications to the clusters' corresponding repositories. For example, in pre-existing systems, separate updates are deployed to each repository associated with an affected cluster, where each update must be manually tuned to account for configurational differences between different clusters. Furthermore, when a modification is required, pre-existing systems require input to determine which clusters to modify (e.g., to determine the clusters for which the given modification is relevant). Because any updates are not uniformly applied to a set of clusters (e.g., because updates must be manually specified for each cluster), pre-existing systems may inefficiently or inaccurately implement modifications to clusters in systems with multiple Kubernetes clusters with differing configurations or attributes.

To solve these technical problems associated with the bulk modification of clusters, the methods and systems disclosed herein enable automated, flexible modification of configurations associated with a variety of clusters (e.g., Kubernetes clusters). For example, the disclosed cluster modification system enables the installation of updates, new software, or modifications to cluster configurations across a set of non-identical clusters. The cluster modification system can receive a request for modification of configuration files associated with a subset of clusters of a network (e.g., a telecommunications network). The request can include information relating to which files are to be modified and what modifications are desired (e.g., attributes or functions to be changed or added to a given configuration file for a given cluster). In some implementations, the cluster modification system can determine the subset of clusters to modify based on an indication of a cluster type or set of features common to the clusters to be modified.

For each cluster to be modified, the system can identify the associated repository and any associated configuration files or configuration information. For example, for each target cluster, the cluster modification system can determine which configuration file to modify as well as any suitable information associated with the cluster (e.g., relating to the cluster's version, features, or technical specifications). Based on this information, the cluster modification system can modify the configuration file associated with the requested modification and store this configuration file in the associated repository prior to deployment to the target cluster. For example, the cluster modification system can modify control plane nodes associated with the target cluster based on the modified configuration file. By doing so, the system enables bulk modification to a set of clusters in an automated manner, thereby improving the efficiency of system maintenance and modification.

The cluster modification system enables efficient scaling of maintenance and modification operations associated with systems of Kubernetes clusters. For example, in a telecommunications network associated with a relatively large set of Kubernetes clusters, the disclosed cluster modification system enables uniform maintenance, updates, and modifications across sets of clusters associated with the network without the need to specify specific clusters or associated configurations. Additionally, the cluster modification system enables flexibility in updates, as the system can automatically determine which clusters to modify in response to a cluster modification request (e.g., based on a cluster type or other cluster attributes). By leveraging repositories, the cluster modification system enables tracking of the history of modifications to individual clusters, as such modifications can be recorded within associated cluster repositories. Furthermore, the repositories enable the rolling back of modifications to clusters by storing previous configuration files, thereby enabling bulk reversion of changes across all suitable clusters within the network. As such, the cluster modification system improves the efficiency of troubleshooting and error mitigation in the system. These benefits associated with the disclosed cluster modification system enable efficient provision of microservices within telecommunications networks (e.g., 5th generation (5G) networks). For example, a telecommunication system can leverage the cluster modification system to maintain network-related functions associated with different Kubernetes clusters in an efficient manner, even when such functions differ in configuration or attributes. By doing so, the telecommunication system enables simultaneous updates to various network-related systems and functions (e.g., associated with microservices in different network slices) in a seamless, uniform manner.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Cluster Modification System

FIG. 1 is a schematic 100 illustrating a network 102 capable of communicating with electronic devices and Kubernetes clusters. For example, the network 102 can include a telecommunications network (e.g., a 5G telecommunications network) configured to communicate with mobile devices (e.g., an electronic device 116-1 and/or an electronic device 116-2) through network access nodes (e.g., network access nodes 114-1 and/or 114-2). In some implementations, electronic devices (e.g., the electronic device 116-1) can communicate with a satellite 118, which can, in turn, communicate with the network 102 through one or more backhaul channels. For example, the network 102 can provision telecommunications services to connected electronic devices through network functions and associated nodes, clusters, and servers.

The network 102 can include one or more devices, systems, or components capable of delivering services over a network (e.g., the internet). For example, the network 102 includes one or more hardware or software components capable of communication with each other and/or other devices. The network 102 can include one or more nodes and/or clusters associated with such nodes (e.g., the cluster 106-1 and/or the cluster 106-2). The network 102 can, additionally or alternatively, include cloud storage, including storage media over multiple servers or devices. The network 102 can include computing power (e.g., processors) capable of executing programs or scripts. Such storage media or computing power can be associated with one or more nodes and/or clusters of such nodes. The network 102 can enable devices external to the network (e.g., the electronic devices 116-1 and/or 116-2) to access, store, or process information stored on associated nodes or devices, such as through one or more application programming interfaces (APIs) via one or more network access nodes 114-1 through 114-2.

The network 102, including all components therein, can interact with electronic devices 116-1 or 116-2 through network access nodes 114-1 and/or 114-2. For example, the network 102 can communicate with other devices, computers and/or terminals through wireless or wired connections. A network access node (NAN) can include, for example, a base station. A base station is a type of NAN that can also be referred to as a cell site, a base transceiver station, or a radio base station. The network 102 can include any combination of NANs including an access point, radio transceiver, gNodeB (gNB), NodeB, eNodeB (eNB), Home NodeB or Home eNB, or the like. In addition to being a wireless wide area network (WWAN) base station, a NAN can be a wireless local area network (WLAN) access point, such as an Institute of Electrical and Electronics Engineers (IEEE) 802.11 access point.

Such NANs can enable communication of the cloud 102 with electronic devices 116-1 and 116-2. An electronic device can include a wireless device. Wireless and electronic devices can be integrated with or embedded in other devices. As illustrated, the electronic devices are distributed throughout the network 102, where each electronic device 116-1 and 116-2 can be stationary or mobile. For example, electronic devices include handheld mobile devices (e.g., smartphones, portable hotspots, tablets, etc.); laptops; wearables; drones; vehicles with wireless connectivity; head-mounted displays with wireless augmented reality/virtual reality (AR/VR) connectivity; portable gaming consoles; wireless routers, gateways, modems, and other fixed-wireless access devices; wirelessly connected sensors that provide data to a remote server over a network; internet of things (IoT) devices such as wirelessly connected smart home appliances, etc.

The network 102 can include various clusters (e.g., the cluster 106-1). A cluster can include a collection of nodes. For example, a node includes one or more hardware components (e.g., as in a computing device or a terminal) or software components (e.g., as in a virtual machine, such as one associated with a container or a container-based orchestration system) that can act as a single machine within a cluster. In some implementations, a node includes memory/storage (e.g., random access memory and/or non-volatile memory) and/or computational power (e.g., one or more central processing units, graphics processing units, and/or processors). Nodes can be associated with a cluster and/or can be provisioned to one or more users. In some cases (e.g., in some Kubernetes-based clusters), the nodes can include one or more virtual machines or containerized applications that are grouped together in pods, sharing resources such as storage, internet protocol (IP) addresses, and/or processing workflows. Nodes enable containerized application-based architectures, such as Kubernetes, to flexibly and predictably provision resources for processing workloads (e.g., executing network functions), as individual nodes can be configured in a modular, consistent manner.

Nodes can be incorporated within clusters, such as the cluster 106-1. A cluster can include any grouping, combination, or organization of nodes. For example, a cluster includes a group of virtual machines, computing devices, and/or servers. In some implementations, nodes within a cluster communicate using local area networks, with each node running its own instance of an operating system. For example, nodes within a cluster exhibit similar hardware, operating systems, and/or software and/or are provisioned for the same purpose or within a similar architecture. To illustrate, the cluster modification system can configure the cluster 106-1 to run containerized applications (e.g., particular network functions associated with a particular network slice), as in a Kubernetes-type container orchestration system. Clusters can include identifiers (e.g., cluster identifiers). For example, a cluster identifier includes an identification number, location indicator, file path, or another indication of a given cluster. The cluster identifiers can be stored in a cluster database, which can include information relating to a cluster, an associated repository, and associated configuration information. To illustrate, a cluster identifier includes a serial number associated with a Kubernetes cluster (e.g., a group of control plane nodes and associated worker nodes). By including cluster identifiers, the cluster modification system enables identification of clusters to be modified, changed, or reverted. For example, the cluster modification system determines a set of cluster identifiers associated with clusters to be modified in response to a cluster modification request, thereby enabling efficient cluster reconfiguration.

Clusters can include subgroups of nodes, such as the control plane node group 108 and/or the worker node group 110. Additionally or alternatively, nodes within the cluster 106-1 reside externally to the network 102 (e.g., can be provisioned through a client device or an entity unaffiliated with the cloud provider). Additionally, nodes can be managed or provisioned by any hardware provisioning system, such as "on-prem" systems, which can include virtual machines that act as nodes. Nodes within such subgroups can have different purposes. By modularizing computations using nodes, clusters enable complex operations, such as processing of workloads, in scalable systems. For example, such clusters enable Kubernetes-type container orchestration, as well as high-performance distributed computing, for improvements in efficiency and scalability of processing tasks.

Clusters (e.g., cluster 106-1), such as Kubernetes clusters, can include control plane nodes, which can reside within the control plane node group 108. A control plane node includes a node (e.g., a machine, virtual and/or physical) that enables management of other nodes within a cluster. For example, control plane nodes make decisions about the given cluster, including scheduling workload processing tasks, scaling deployments, and enforcing policies. In some implementations, a control plane node monitors the health of the cluster, updates services, and/or responds to cluster events. A control plane node can communicate with worker nodes, pods, or services, as well as API servers, secure shell (SSH) tunnels, and/or other control plane network connections. In some cases, a group of control plane nodes (e.g., the control plane node group 108) includes ones or more control plane nodes.

A control plane node (or any suitable node, such as a worker node) can include an associated configuration (e.g., a control plane node configuration). For example, the control plane node configuration includes information relating to the set up, connections, registrations, and software associated with a given Kubernetes cluster. The control plane node configuration can include operating system images, worker node configurations, and information relating to numbers or attributes of control plane nodes. In some implementations, the control plane node configuration defines or controls network interfaces and can specify IP addresses associated with components of the network 102. The control plane node configuration can include APIs or related functions, enabling communication and exposure to other system components. For example, the control plane node configuration can include indications of version identifiers, features, or components (e.g., databases, functions, or other applications) associated with a given cluster. The configuration information can include master configuration information, including information relating to nodes associated with hosts that include control plane components (e.g., an API server, a controller management server, and etcd).

Configurations associated with master configuration files or node configuration files can include admission control configurations, asset configurations, authentication and authorization configurations, controller configurations, etcd configurations, grant configurations, image configurations, image policy configurations, Kubernetes master configurations, network configurations, project configurations, scheduler configurations, security allocator configurations, service account configurations, or other suitable types of configurations. For example, a node configuration file includes pod and node configurations, docker configurations, and/or local storage configurations. A cluster modification request can request to alter, modify, or change parameters, values, or configurations associated with these clusters.

For example, a given configuration file can include a cluster component property indicating a value, attribute, or parameter associated with a given configuration file, a given cluster, and/or a given node therein. The configuration file can include element fields, which specify elements associated with such fields. For example, a configuration file (e.g., in a structured format, such as a Yet Another Markup Language (YAML) format) can include fields (e.g., relative or absolute locations in the text of a configuration file), which can specify parameters, attributes, or other values associated with a given configuration file of a node or a cluster. The configuration file can be modified by altering these values, parameters, elements, or the element fields themselves (e.g., by modifying the number of attributes associated with a given configuration file).

In some implementations, a configuration file can be modified according to configuration data associated with an associated repository, cluster, or node. Cluster configuration data can include information specifying features, attributes, or parameters of a given cluster. For example, cluster configuration data includes version identifiers (e.g., identifiers of versions of software, hardware, or architectures associated with a given cluster or node), file paths (e.g., associated with source code files or other resources), resource identifiers (e.g., identifiers/file paths of features, applications, or system resources for a particular cluster), and/or client system identifiers (e.g., identifiers of a mobile device connected to or exposed to a given network function associated with a cluster). In some embodiments, the cluster modification system 202 can modify a given configuration file according to configuration data for a given cluster. For example, the cluster modification system 202 modifies elements associated with element fields within a cluster's master configuration file according to configuration data associated with the particular cluster (e.g., an API address for the particular Kubernetes cluster). By doing so, the cluster modification system 202 can tailor modifications to a given cluster's configuration in a flexible, cluster-specific manner.

A configuration associated with a cluster or a node can include a system image (e.g., an operating system image). A system image can include a serialized copy of a state of a computer system (e.g., an operating system). The operating system image can include a file that includes reference files, folders, and executable programs associated with the installation and/or configuration of an operating system on a node, computer, or cluster. For example, the operating system image includes configurations associated with containers (e.g., virtual images) of a Kubernetes cluster. The cluster modification system disclosed herein enables modifications, updates, or replacements for system images associated with clusters, nodes, or devices (e.g., Kubernetes clusters of a 5G telecommunications network).

The cluster 106-1 can include one or more worker nodes (e.g., within the worker node group 110). A worker node includes nodes that run containerized applications on container orchestration systems. For example, a worker node includes one or more virtual machines in order to process workloads or other processes. Worker nodes can include interfaces for communication with worker nodes or control plane nodes (e.g., kubelet), enabling communication with, for example, API servers running on the control plane node. For example, worker nodes enable processing or running of one or more containerized applications (e.g., as in a pod). The control plane node group 108 can control, manage, and/or execute tasks through worker nodes within the worker node group 110.

Figure 2:
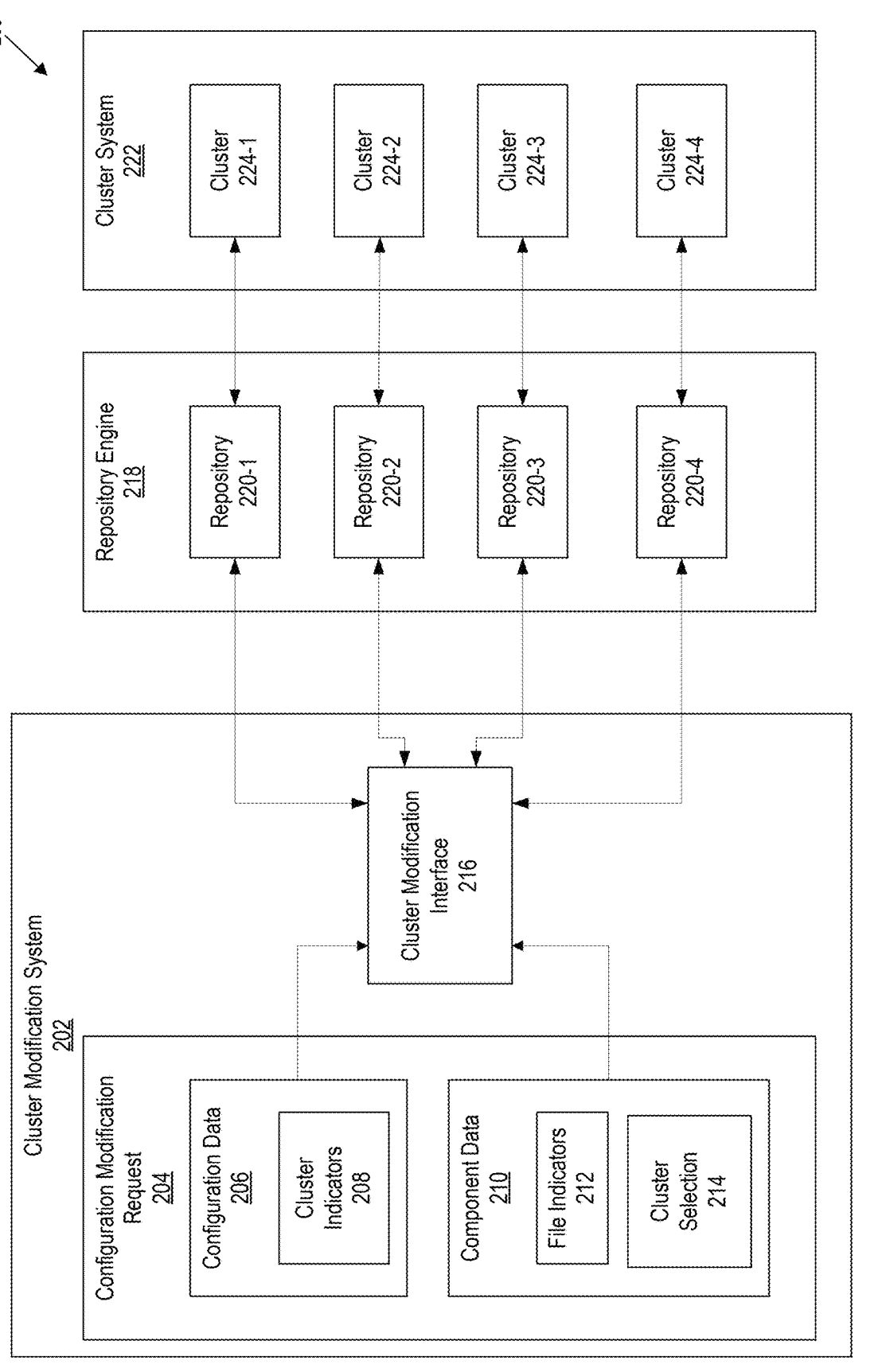
FIG. 2 is a schematic that illustrates a cluster modification system configured to modify cluster configurations in bulk based on configuration and component data.

FIG. 2 is a schematic 200 that illustrates a cluster modification system 202 configured to modify cluster configurations in bulk based on configuration and component data. For example, the cluster modification system 202 enables updates to clusters 224-1, 224-2, 224-3, and/or 224-4 in a cluster system 222 based on a cluster modification request 204. The cluster modification system 202 can update clusters of the cluster system 222 through repositories 220-1, 220-2, 220-3, and/or 220-4 of a repository engine 218. By doing so, the cluster modification system 202 enables efficient bulk updates to clusters (e.g., Kubernetes clusters of a telecommunications network) by selecting clusters and modifying configurations in a uniform, flexible manner.

For example, the cluster modification system 202 can include (e.g., obtain or receive) a cluster modification request 204 associated with one or more clusters. For example, the cluster modification request 204 can include a request to modify configurations associated with nodes (e.g., virtual or otherwise), such as nodes associated with a container orchestration platform. The cluster modification request can include configuration data 206, such as data indicating target clusters for the modification (e.g., cluster indicators 208). The cluster modification request 204 can include component data 210 indicating components of clusters to be modified. For example, the component data 210 can include file indicators that specify files to be modified (e.g., configuration files associated with given clusters). In some embodiments, the cluster modification system 202 can generate, obtain, or receive information associated with specific clusters to be modified (e.g., the cluster selection 214). By receiving such information, the cluster modification system 202 determines how and where to modify given clusters (e.g., Kubernetes clusters associated with a telecommunications system).

The cluster modification system 202 can determine target clusters (e.g., a subset of the clusters within the cluster system 222). For example, the cluster modification system 202 can obtain, through the cluster modification request 204, a cluster classification or type associated with the desired cluster modification. To illustrate, the cluster modification system 202 can receive cluster indicators 208 that specify that clusters with particular functions (e.g., clusters associated with network exposure functions in a telecommunications network) are to be modified. The cluster indicators 208 can specify functions, elements, types, or configurations associated with clusters to be modified or updated. For example, the cluster indicators 208 can include flags or keywords indicating such functions, elements, types, or configurations. The indication of target clusters (e.g., the cluster indicators 208) can specify particular clouds (e.g., cloud service provider or another address associated with a cloud) within which nodes are to be modified in response to the cluster modification request 204. Additionally or alternatively, the cluster indicators 208 can include a region (e.g., a geographical or virtual region) associated with the clusters to be modified. In some embodiments, the cluster indicators 208 include information relating to environments (e.g., variables, network connections, or other contextual information) associated with nodes to be modified. The cluster indicators 208 associated with the target clusters can include information relating to particular subscriptions associated with particular clusters (e.g., particular telecommunications services or network slices associated with a 5G telecommunications network). As such, the cluster modification system 202 can obtain information relating to which clusters to modify, thereby enabling the flexibility of the cluster modification system 202 in handling cluster modifications.

The cluster modification request 204 can include modification indicators, such as component data 210, associated with the requested modification. For example, the modification indicators can include information associated with which files (e.g., which configurations) to modify and how. The modification indicator can specify an update to one or more cluster component properties. For example, the modification indicators can include the file indicators 212, which can include indications of file paths of files to be modified or updated. The file indicators 212 can include file paths or addresses to configuration files, such as structured data files (YAML files) associated with configurations for clusters or nodes within. In some implementations, modification indicators include information relating to how such files are to be modified, including variables or dictionary entries associated with the files to be modified. For example, the modification indicators can include an indication that a version number included within a given configuration file associated with a Kubernetes cluster is to be updated. By obtaining such modification indicators, the cluster modification system receives information relating to updates or changes to nodes or cluster configurations, enabling the cluster modification system to effect such changes across a variety of target clusters.

In some cases, the cluster modification system identifies a subset of clusters to be modified (e.g., target clusters). A target cluster includes a cluster associated with a given update, modification, or reversion. For example, a target cluster includes a cluster associated with a cluster classification identified within a cluster modification request, as described below. The cluster modification request can specify a cluster type, as well as an indication of a configuration modification to be implemented on target clusters of this cluster type, thereby enabling the cluster modification system to modify suitable clusters accordingly. Based on the cluster indicators 208 (e.g., the indication of target clusters), the cluster modification system 202 can determine a cluster grouping associated with clusters to be modified (e.g., a cluster selection 214). For example, the cluster grouping can include an indication of cluster identifiers associated with a cluster selection 214, where each cluster identifier is associated with a cluster to which the cluster modification request is relevant. For example, where the cluster modification request requests modification to clusters associated with a particular network function (e.g., a session management function), the cluster modification system can determine a set of cluster identifiers associated with clusters that provide such functions. As such, the cluster modification system 202 specifies a subset of clusters to modify in response to a modification request, thereby improving the efficiency of cluster modification, as other unrelated clusters are unaffected by the request.

Based on information associated with which types of configurations and clusters to modify (e.g., the configuration data 206) and which components of these configurations and clusters to modify (e.g., the component data 210), the cluster modification system 202 can modify repositories associated with the suitable clusters, such as through the cluster modification interface 216. To illustrate, the cluster modification interface 216 can include an API, a virtual machine, a physical machine, or another component capable of determining modifications to clusters' repositories associated with a cluster modification request 204. For example, the cluster modification interface 216 can retrieve a configuration file associated with a given cluster (e.g., the cluster 224-1) through an associated repository (e.g., the repository 220-1), where the configuration file is to be modified in response to the cluster modification request 204. Based on this configuration file, the cluster modification system 202 can modify the configuration file according to the cluster modification request 204, thereby updating the cluster (and any other suitable clusters) as requested in an automated, efficient manner.

A repository can include storage associated with files or resources for a computational device. For example, a repository is a centrally located storage device (e.g., virtual or physical) to make and manage changes associated with an application's source code, including configurations or programs associated with clusters (e.g., Kubernetes clusters) and associated virtual or physical nodes. For example, a repository enables editing of files, tracking of changes in code, and collaboration associated with clusters. The repository enables the creation of source code files (e.g., and/or configuration files), the configuration of the repository (e.g., association of a repository with a user identifier and/or user credentials), and modification of the repository. For example, a repository enables developers to store changes on a local system associated with a mobile device or user terminal and merge these changes to a database of the repository itself. Another developer can change the same file in an analogous manner, enabling manual review and conflict resolution from different edits or modifications. As such, by utilizing repositories to modify configuration files associated with telecommunications clusters, the cluster modification system 202 enables dynamic tracking of modifications to given systems, thereby improving the accuracy and conflict mitigation abilities of the associated systems (e.g., an associated 5G telecommunications system).

In some implementations, a repository includes a repository identifier, such as an identification number, name, or another token associated with a repository. For example, a repository identifier includes a unique identifier, such as a numerical repository identifier (ID) in a hexadecimal or other base system. The repository identifier can be or include a hierarchy identifier and/or a partition identifier, and/or can include an identifier of an associated cluster or node (e.g., a cluster or a node identifier, respectively). By generating, tracking, or utilizing repository identifiers, the cluster modification system 202 enables specification of particular repositories (or associated clusters) for modification, thereby preventing the need for updating or monitoring other repositories associated with irrelevant clusters.

Based on modifying suitable repositories of the repository engine 218 (e.g., repositories 220-1, 220-2, 220-3, and/or 220-4), the cluster modification system 202 enables modification or merging of modifications to configurations associated with particular clusters (e.g., clusters 224-1, 224-2, 224-3, and/or 224-4) of the cluster system 222. As such, the cluster modification system 202 enables bulk modification of various clusters simultaneously on the basis of cluster modification requests, while tailoring such modifications to the configurations associated with the particular clusters to be modified.

In some implementations, the cluster modification system 202 receives a configuration history request. The configuration history request can include a request for a configuration history (e.g., a history of modifications or previous configurations, files, or parameters/values associated with a given repository, cluster, or node). For example, the configuration history includes configuration files associated with a given cluster and associated timestamps (e.g., timestamps of the generation, modification, or implementation of the particular configuration file). The cluster modification system 202 enables generation or determination of the configuration history (e.g., for display on a user interface in response to a configuration history request). For example, the cluster modification system 202 can query APIs associated with suitable repositories for tracked changes to configuration files, thereby providing information relating to previous changes to a given cluster's source code and configurations. By doing so, the cluster modification system 202 enables improved troubleshooting and conflict mitigation (e.g., in situations where multiple developers may modify the same files at the same time in a contradictory manner).

For example, the cluster modification system 202 receives a revert request. The revert request can include an indication or request to revert changes to a previous version of a given cluster or a set of clusters. For example, the revert request specifies a type or group of clusters (e.g., an indication of target clusters) associated with the reversion, as well as a timestamp, version identifier, or configuration file template or type to which to revert. In response to this revert request, the cluster modification system 202 can determine a previous version of configuration files for the suitable clusters and revert changes accordingly, thereby improving the resilience and error mitigation abilities of the system (e.g., an associated 5G telecommunications network).

FIG. 3 is a flowchart 300 that illustrates a process for modifying cluster configurations in bulk in response to a cluster modification request. For example, FIG. 3 enables automated bulk updates of configuration files for multiple Kubernetes clusters associated with a 5G telecommunications system simultaneously, in an efficient and cluster-specific manner.

At act 302, the cluster modification system can receive a cluster modification request. For example, the cluster modification system receives, from an administrator device, a cluster modification request including an indication of target clusters and a set of modification indicators. Each modification indicator in the set of modification indicators can indicate an update to a cluster component property. As an illustrative example, the cluster modification system receives a request to modify an element of a configuration file associated with a set of Kubernetes clusters of a 5G telecommunications network. For example, the cluster modification request can specify a modification to an operating system image version for any clusters associated with a particular network function (e.g., a network exposure function). By doing so, the cluster modification system receives information that enables bulk modification of clusters in an efficient manner, in response to this cluster modification request.

At act 304, the cluster modification system can identify a set of cluster identifiers (e.g., associated with target clusters). For example, the cluster modification system identifies a set of cluster identifiers using the received indication of target clusters. In some implementations, the cluster modification system determines cluster identifiers associated with clusters that are to be modified or are otherwise relevant to the received cluster modification request. As an illustrative example, the cluster modification system determines cluster identifiers for Kubernetes clusters associated with the particular network function identified within the cluster modification request (e.g., clusters associated with network exposure functions). By identifying such clusters, the cluster modification system pinpoints which clusters are to be modified, thereby enabling flexible improvements, updates, and modifications to particular clusters, as defined by particular attributes, features, or requirements.

In some implementations, the cluster modification system determines the set of cluster identifiers by identifying whether the modification request indicates a particular characteristic or attribute associated with the clusters that are to be modified. For example, the cluster modification system determines that the indication of target clusters includes an indication of a cloud, a region, an environment, or a subscription. The cluster modification system can determine a cluster grouping based on the indication of target clusters. The cluster modification system can identify, using a cluster database, the set of cluster identifiers, wherein each cluster identifier of the set of cluster identifiers is associated with the cluster grouping. As an illustrative example, the cluster modification system determines properties of a given cluster that are consistent with an indication on the modification request, such as an indication of a particular cloud or cloud location associated with the clusters, a particular region (e.g., geographical or virtual), a particular environment (e.g., a particular software environment or functional environment, such as a network slice), or a subscription (e.g., a particular telecommunications network subscription). By doing so, the cluster modification system enables determination of particular clusters for modification or updates, thereby improving the flexibility of the system in responding to cluster modification requests.

At act 306, the cluster modification system can retrieve a repository identifier, configuration file, and cluster configuration data associated with particular clusters to be modified. For example, for each particular cluster identifier in the set of cluster identifiers, the cluster modification system retrieves, for the particular cluster identifier, an associated repository identifier, an associated configuration file, and associated cluster configuration data. As an illustrative example, the cluster modification system determines a configuration file that is stored within a repository associated with a cluster of the set of clusters that are to be modified in response to the cluster modification request. For example, the cluster modification system can retrieve a repository identifier (e.g., a repository file path or location) for a cluster to be modified in response to the cluster modification request. The cluster modification system identifies and retrieves, within the identified repository, a configuration file associated with a network function to be modified in response to the cluster modification request, such as a configuration file associated with network connections accessible to a network exposure function of a 5G telecommunications network. By doing so, the cluster modification system determines where to execute a given modification or update.

At act 308, the cluster modification system can generate a modified configuration file using the retrieved configuration file. For example, for each particular cluster identifier in the set of cluster identifiers, the cluster modification system generates, using the retrieved configuration file, a modified configuration file based on the set of modification indicators and the retrieved cluster configuration data. As an illustrative example, the cluster modification system can modify elements, attributes, features, or characteristics of a given configuration file according to the cluster modification request. For example, the cluster modification system can alter an operating system image version number as well as a file path to the associated operating system image that is to be used within a cluster associated with network exposure functions. In some implementations, the modifications can be according to the cluster-specific configuration data associated with the particular cluster. For example, the operating system image to be added or modified to a given cluster can be altered depending on the hardware or software attributes of the particular target cluster. By doing so, the cluster modification system enables cluster-specific improvements, modifications, and updates to component properties associated with clusters (e.g., clusters in container orchestration systems), thereby improving the flexibility and efficiency of updates across a variety of clusters with different characteristics.

In some implementations, the cluster modification system can generate the modified configuration file by changing or populating element fields with suitable information. For example, the cluster modification system identifies an element field of the retrieved configuration file. The cluster modification system can determine, for the particular cluster identifier, an element associated with the element field. The cluster modification system may modify the retrieved configuration file to populate the element field with the element to generate the modified configuration file. As an illustrative example, the cluster modification system can identify an element field, such as a field corresponding to a Media Access Control (MAC) address of a cluster component, stored within a tree-like data structure (e.g., a YAML file).

The cluster modification system can determine (e.g., through cluster configuration data), the corresponding element (e.g., the MAC address for the particular cluster) and populate the field within the configuration field accordingly. For example, the cluster modification system can customize an operation system image that is to be updated based on these attributes (e.g., the MAC address) by altering the associated configuration file accordingly. By doing so, the cluster modification system enables flexible, cluster-specific modifications to configuration files in response to cluster modification requests.

In some implementations, the cluster modification system can retrieve information such as a version identifier, a file path, a resource identifier, or a client system identifier associated with the target cluster to aid in the modification of the configuration file. For example, the cluster modification system determines, within the retrieved cluster configuration data for the particular cluster identifier, a configuration field associated with a version identifier, a file path, a resource identifier, or a client system identifier. The cluster modification system can generate the element to include a value that is associated with the configuration field. For example, the cluster modification system can determine that the cluster modification request requires configuration files to be updated in a cluster-specific manner, with the modified configuration files being updated according to cluster-specific attributes or characteristics (e.g., cluster-specific file paths to resources). As such, the cluster modification system can populate elements within the element fields in a configuration file according to suitable parameters (e.g., corresponding to configuration fields) associated with the given target cluster. By doing so, the cluster modification system provides updates and modifications to various clusters in a cluster-specific manner, thereby enabling bulk modifications to clusters, even if such clusters exhibit differing characteristics or attributes.

At act 310, the cluster modification system can store the modified configuration file in an associated repository. For example, for each particular cluster identifier in the set of cluster identifiers, the cluster modification system stores the modified configuration file in a repository associated with the retrieved repository identifier. As an illustrative example, the cluster modification system stores the modified configuration file in a database that includes other changes, code, or documentation associated with a given cluster. For example, the repository can include previous versions of the configuration file, as well as other configuration files, associated with a particular cluster. Storing the modified configuration file within a repository provides control over the manner and time at which any changes are implemented—for example, changes can be synchronized to be implemented simultaneously across various clusters. Moreover, by storing the modified configuration file within the repository, the cluster modification system enables tracking of changes over time and across different clusters, thereby improving the ease of troubleshooting and conflict resolution (e.g., in situations where contradictory edits are made by different users or systems).

At act 312, the cluster modification system can transmit a request to the repository associated with the particular cluster identifier to modify an existing control plane node configuration of a target cluster. For example, the cluster modification system transmits a request to the repository to modify an existing control plane node configuration of a target cluster, wherein the request enables the repository to generate a modified control plane node configuration of the target cluster using the modified configuration file. As an illustrative example, the cluster modification system can transmit an implementation request to the control plane nodes (or other nodes) associated with the clusters to implement the required changes. The request can include the modified configuration file and any other suitable dependencies. In some implementations, the cluster modification system can transmit these requests at a particular time (e.g., to synchronize such requests across various target clusters). As such, the cluster modification system enables efficient bulk modification to cluster configurations, even if such clusters have distinct properties or attributes.

In some implementations, the cluster modification system can cause an update to an operating system or an operating system image on the basis of the modified configuration file. For example, the cluster modification system generates an updated operating system image based on the modified configuration file. The cluster modification system can replace, for the target cluster, an operating system image with the updated operating system image. As an illustrative example, the cluster modification system can replace an operating system image associated with a particular cluster based on the updated configuration file stored within the repository (e.g., subsequent to staging a given update to a configuration file). For example, the cluster can parse a file path associated with the updated operating system image (e.g., stored on a database or within an associated repository) and load in the updated operating system image in place of an existing operating system image. By doing so, the cluster modification system enables dynamic updates to clusters and cluster-based software in bulk, in a flexible and cluster-specific manner.

In some implementations, the cluster modification system can store, retrieve, and/or generate a history of previous configurations associated with a given cluster. For example, the cluster modification system receives, from the administrator device and for each particular cluster identifier in the set of cluster identifiers, a configuration history request including the particular cluster identifier. The cluster modification system can transmit a request for a configuration file history to the repository associated with the retrieved repository identifier. The cluster modification system can receive, from the repository, a set of previous configuration files and associated timestamps. The set of previous configuration files can include the modified configuration file. The cluster modification system can transmit, to the administrator device, the set of previous configuration files and the associated timestamps. As an illustrative example, the cluster modification system determines previous configuration files associated with a given cluster (e.g., as stored in a cluster-specific repository or sub-repository). The cluster modification system can provide a summary or report of these files as well as a history of when these files were modified, updated, and/or implemented on the target clusters (e.g., including associated timestamps). By doing so, the cluster modification system improves troubleshooting and error mitigation associated with changes or updates to configurations for clusters.

In some implementations, the cluster modification system can cause a reversion of changes or modifications to clusters. For example, the cluster modification system receives, from the administrator device, a revert request for the cluster modification request. The cluster modification system can determine that clusters associated with the set of cluster identifiers are associated with the cluster modification request. In response to the revert request, for each particular cluster identifier in the set of cluster identifiers, the cluster modification system can transmit a request to the repository linked to the particular cluster identifier to revert the modified control plane node configuration to the existing control plane node configuration. As an illustrative example, the cluster modification system can receive a request from a device (e.g., associated with an administrator of a telecommunications system) to revert any modifications that were executed in a particular time range (e.g., before a particular reference timestamp) in order to troubleshoot a problem with the cluster's operation. Based on this request, the cluster modification system can determine which configuration file is associated with the given cluster prior to the relevant changes and can determine to update the cluster according to this previous configuration file. By doing so, the cluster modification system enables improvements to troubleshooting and error mitigation for the system (e.g., a 5G telecommunications network) by providing a manner to revert changes. Such reversions can apply to a subset of clusters and/or all suitable clusters within the cluster system 222, as shown in FIG. 2.

Computer System

Figure 4:
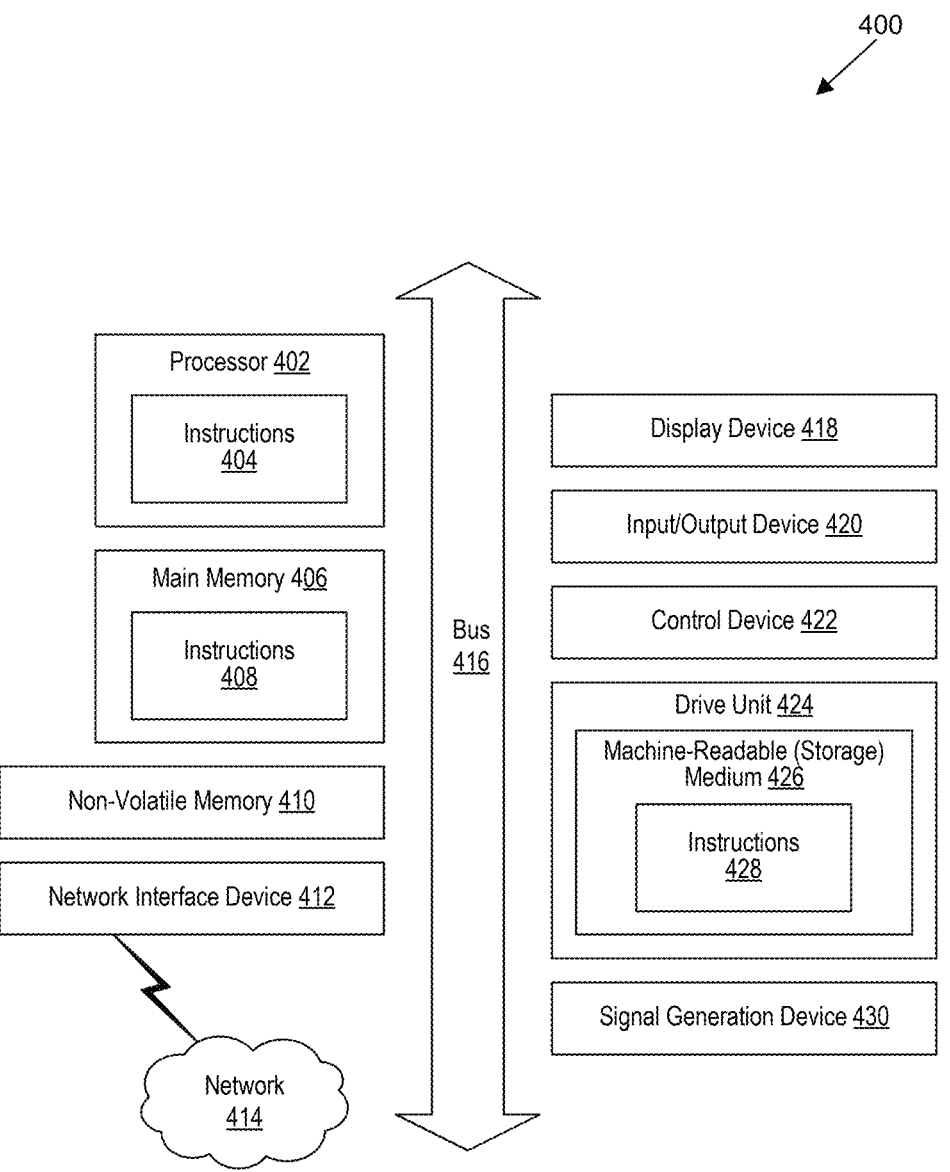
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, a video display device 418, an input/output device 420, a control device 422 (e.g., keyboard and pointing device), a drive unit 424 that includes a machine-readable (storage) medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computer system 400 can share a similar architecture as that of a server computer, personal computer (PC), tablet computer, mobile telephone, game console, music player, wearable electronic device, network-connected ("smart") device (e.g., a television or home assistant device), AR/VR system (e.g., head-mounted display), or any electronic device capable of executing a set of instructions that specify action(s) to be taken by the computer system 400. In some implementations, the computer system 400 can be an embedded computer system, a system-on-chip (SOC), a single-board computer (SBC) system, or a distributed system such as a mesh of computer systems, or it can include one or more cloud components in one or more networks. Where appropriate, one or more computer systems 400 can perform operations in real time, in near real time, or in batch mode.

The network interface device 412 enables the computer system 400 to mediate data in a network 414 with an entity that is external to the computer system 400 through any communication protocol supported by the computer system 400 and the external entity. Examples of the network interface device 412 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable medium 426 can include any medium that is capable of storing, encoding, or carrying a set of instructions for execution by the computer system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computer system 400 to perform operations to execute elements involving the various aspects of the disclosure.

Wireless Communications System

Figure 5:
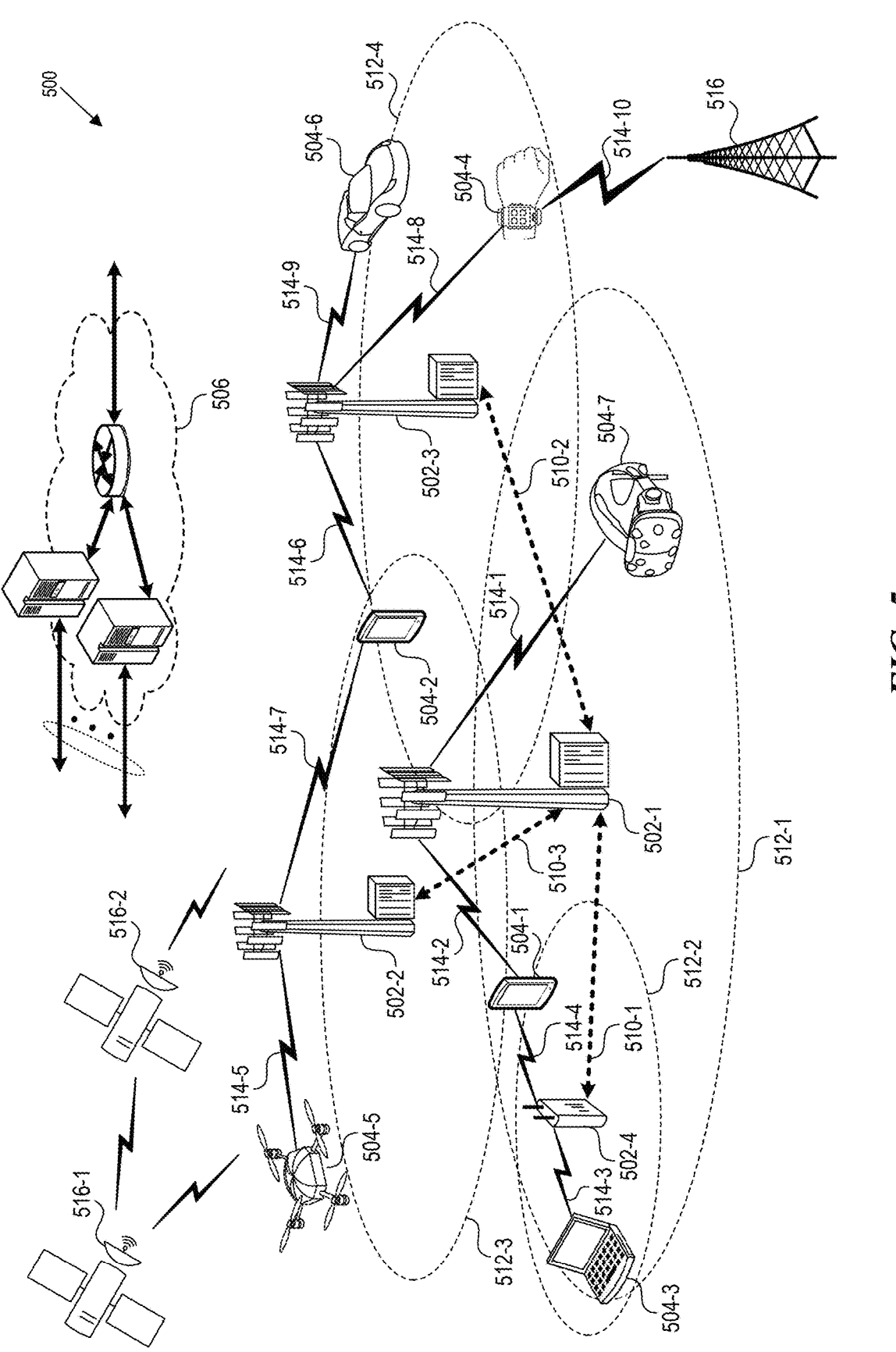
FIG. 5 is a block diagram that illustrates a wireless communications system that can implement aspects of the present technology.

FIG. 5 is a block diagram that illustrates a wireless telecommunication network 500 ("network 500") in which aspects of the disclosed technology are incorporated. The network 500 includes base stations 502-1 through 502-4 (also referred to individually as "base station 502" or collectively as "base stations 502").

The NANs of a network 500 formed by the network 500 also include wireless devices 504-1 through 504-7 (referred to individually as "wireless device 504" or collectively as "wireless devices 504") and a core network 506. The wireless devices 504 can correspond to or include network 500 entities capable of communication using various connectivity standards. For example, a 5G communication channel can use millimeter wave (mmW) access frequencies of 28 gigahertz (GHz) or more. In some implementations, the wireless device 504 can operatively couple to a base station 502 over a long-term evolution/long-term evolution-advanced (LTE/LTE-A) communication channel, which is referred to as a 4G communication channel.

The core network 506 provides, manages, and controls security services, user authentication, access authorization, tracking, IP connectivity, and other access, routing, or mobility functions. The base stations 502 interface with the core network 506 through a first set of backhaul links (e.g., S1 interfaces) and can perform radio configuration and scheduling for communication with the wireless devices 504 or can operate under the control of a base station controller (not shown). In some examples, the base stations 502 can communicate with each other, either directly or indirectly (e.g., through the core network 506), over a second set of backhaul links 510-1 through 510-3 (e.g., X1 interfaces), which can be wired or wireless communication links.

The base stations 502 can wirelessly communicate with the wireless devices 504 via one or more base station antennas. The cell sites can provide communication coverage for geographic coverage areas 512-1 through 512-4 (also referred to individually as "coverage area 512" or collectively as "coverage areas 512"). The coverage area 512 for a base station 502 can be divided into sectors making up only a portion of the coverage area (not shown). The network 500 can include base stations of different types (e.g., macro and/or small cell base stations). In some implementations, there can be overlapping coverage areas 512 for different service environments (e.g., internet of things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 500 can include a 5G network 500 and/or an LTE/LTE-A or other network. In an LTE/LTE-A network, the term "eNBs" is used to describe the base stations 502, and in 5G new radio (NR) networks, the term "gNBs" is used to describe the base stations 502 that can include mmW communications. The network 500 can thus form a heterogeneous network 500 in which different types of base stations provide coverage for various geographic regions. For example, each base station 502 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 500 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 500 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 500 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A MAC layer can perform priority handling and multiplexing of logical channels into transport channels. The MAC layer can also use Hybrid ARQ (HARQ) to provide retransmission at the MAC layer to improve link efficiency. In the control plane, the Radio Resource Control (RRC) protocol layer provides establishment, configuration, and maintenance of an RRC connection between a wireless device 504 and the base stations 502 or core network 506 supporting radio bearers for the user plane data. At the Physical (PHY) layer, the transport channels are mapped to physical channels.

Wireless devices can be integrated with or embedded in other devices. As illustrated, the wireless devices 504 are distributed throughout the network 500, where each wireless device 504 can be stationary or mobile. For example, wireless devices can include handheld mobile devices 504-1 and 504-2 (e.g., smartphones, portable hotspots, tablets, etc.); laptops 504-3; wearables 504-4; drones 504-5; vehicles with wireless connectivity 504-6; head-mounted displays with wireless AR/VR connectivity 504-7; portable gaming consoles; wireless routers, gateways, modems, and other fixed-wireless access devices; wirelessly connected sensors that provide data to a remote server over a network; IoT devices such as wirelessly connected smart home appliances; etc.

A wireless device (e.g., wireless devices 504) can be referred to as a user equipment (UE), a customer premises equipment (CPE), a mobile station, a subscriber station, a mobile unit, a subscriber unit, a wireless unit, a remote unit, a handheld mobile device, a remote device, a mobile subscriber station, a terminal equipment, an access terminal, a mobile terminal, a wireless terminal, a remote terminal, a handset, a mobile client, a client, or the like.

A wireless device can communicate with various types of base stations and network 500 equipment at the edge of a network 500 including macro eNBs/gNBs, small cell eNBs/gNBs, relay base stations, and the like. A wireless device can also communicate with other wireless devices either within or outside the same coverage area of a base station via device-to-device (D2D) communications.

The communication links 514-1 through 514-10 (also referred to individually as "communication link 514" or collectively as "communication links 514") shown in network 500 include uplink (UL) transmissions from a wireless device 504 to a base station 502 and/or downlink (DL) transmissions from a base station 502 to a wireless device 504. The DL transmissions can also be called forward link transmissions while the UL transmissions can also be called reverse link transmissions. Each communication link 514 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 514 can transmit bidirectional communications using frequency division duplex (FDD) (e.g., using paired spectrum resources) or time division duplex (TDD) operation (e.g., using unpaired spectrum resources). In some implementations, the communication links 514 include LTE and/or mmW communication links.

In some implementations of the network 500, the base stations 502 and/or the wireless devices 504 include multiple antennas for employing antenna diversity schemes to improve communication quality and reliability between base stations 502 and wireless devices 504. Additionally or alternatively, the base stations 502 and/or the wireless devices 504 can employ multiple-input, multiple-output (MIMO) techniques that can take advantage of multi-path environments to transmit multiple spatial layers carrying the same or different coded data.

In some examples, the network 500 implements 6G technologies including increased densification or diversification of network nodes. The network 500 can enable terrestrial and non-terrestrial transmissions. In this context, a Non-Terrestrial Network (NTN) is enabled by one or more satellites, such as satellites 516-1 and 516-2, to deliver services anywhere and anytime and provide coverage in areas that are unreachable by any conventional Terrestrial Network (TN). A 6G implementation of the network 500 can support terahertz (THz) communications. This can support wireless applications that demand ultra-high quality of service (QOS) requirements and multi-terabits-per-second data transmission in the era of 6G and beyond, such as terabit-per-second backhaul systems, ultra-high-definition content streaming among mobile devices, AR/VR, and wireless high-bandwidth secure communications. In another example of 6G, the network 500 can implement a converged Radio Access Network (RAN) and core architecture to achieve Control and User Plane Separation (CUPS) and achieve extremely low user plane latency. In yet another example of 6G, the network 500 can implement a converged Wi-Fi and core architecture to increase and improve indoor coverage.

5G Core Network Functions

Figure 6:
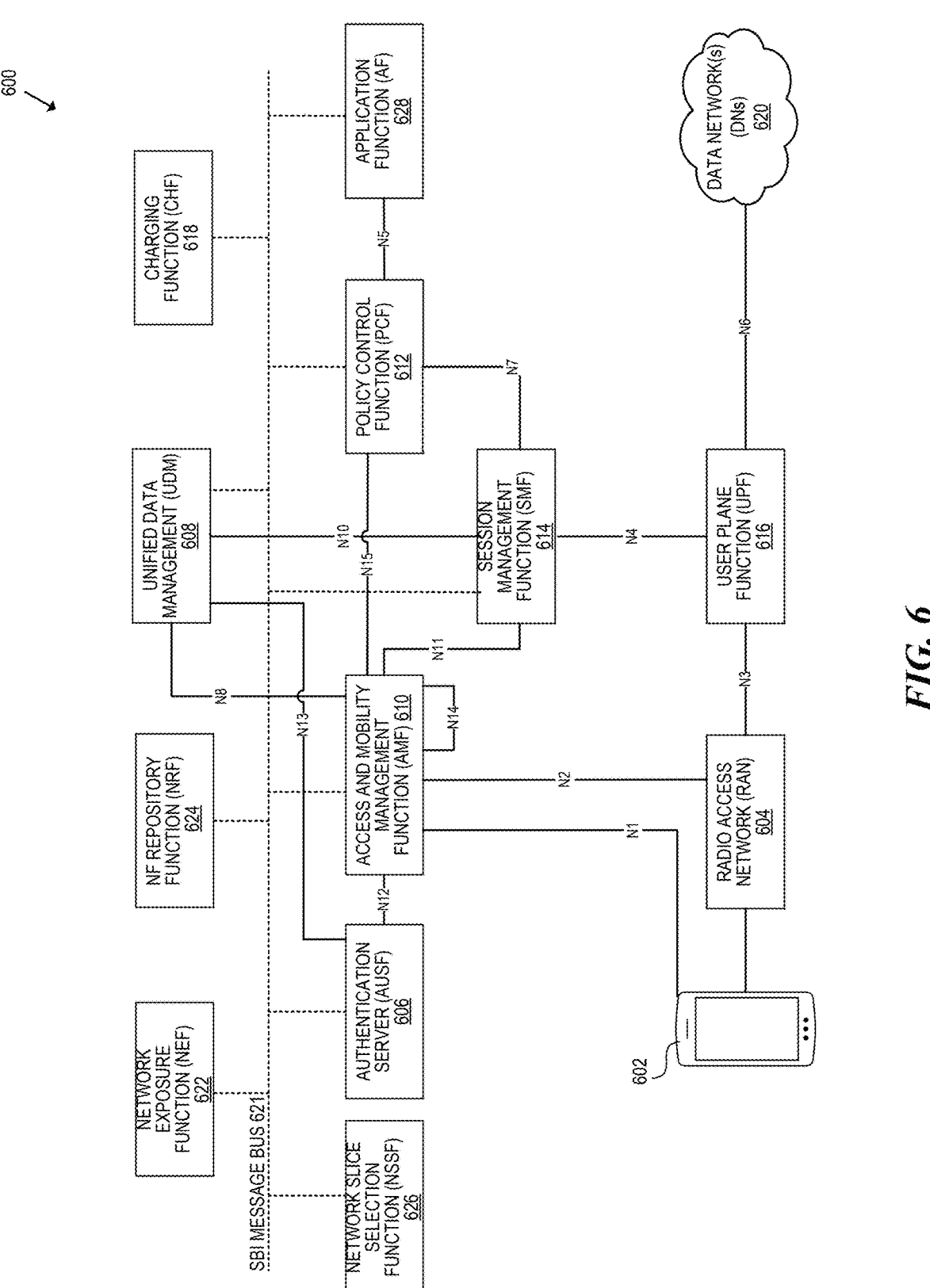
FIG. 6 is a block diagram that illustrates 5G core network functions (NFs) that can implement aspects of the present technology.

FIG. 6 is a block diagram that illustrates an architecture 600 including 5G core NFs that can implement aspects of the present technology. A wireless device 602 can access the 5G network through a NAN (e.g., gNB) of a RAN 604. The NFs include an Authentication Server Function (AUSF) 606, a Unified Data Management (UDM) 608, an Access and Mobility Management Function (AMF) 610, a Policy Control Function (PCF) 612, a Session Management Function (SMF) 614, a User Plane Function (UPF) 616, and a Charging Function (CHF) 618.

The interfaces N1 through N15 define communications and/or protocols between each NF as described in relevant standards. The UPF 616 is part of the user plane and the AMF 610, SMF 614, PCF 612, AUSF 606, and UDM 608 are part of the control plane. One or more UPFs can connect with one or more data networks (DNs) 620. The UPF 616 can be deployed separately from control plane functions. The NFs of the control plane are modularized such that they can be scaled independently. As shown, each NF service exposes its functionality in a Service Based Architecture (SBA) through a Service Based Interface (SBI) 621 that uses HTTP/2. The SBA can include a Network Exposure Function (NEF) 622, an NF Repository Function (NRF) 624, a Network Slice Selection Function (NSSF) 626, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 624, which maintains a record of available NF instances and supported services. The NRF 624 allows other NF instances to subscribe and be notified of registrations from NF instances of a given type. The NRF 624 supports service discovery by receipt of discovery requests from NF instances and, in response, details which NF instances support specific services.

The NSSF 626 enables network slicing, which is a capability of 5G to bring a high degree of deployment flexibility and efficient resource utilization when deploying diverse network services and applications. A logical end-to-end (E2E) network slice has pre-determined capabilities, traffic characteristics, and service-level agreements and includes the virtualized resources required to service the needs of a Mobile Virtual Network Operator (MVNO) or group of subscribers, including a dedicated UPF, SMF, and PCF. The wireless device 602 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 608 and then requests an appropriate network slice of the NSSF 626.

The UDM 608 introduces a User Data Convergence (UDC) that separates a User Data Repository (UDR) for storing and managing subscriber information. As such, the UDM 608 can employ the UDC under 3GPP TS 22.101 to support a layered architecture that separates user data from application logic. The UDM 608 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 608 can contain a voluminous amount of data that is accessed for authentication. Thus, the UDM 608 is analogous to a Home Subscriber Server (HSS) and can provide authentication credentials while being employed by the AMF 610 and SMF 614 to retrieve subscriber data and context.

The PCF 612 can connect with one or more Application Functions (AFs) 628. The PCF 612 supports a unified policy framework within the 5G infrastructure for governing network behavior. The PCF 612 accesses the subscription information required to make policy decisions from the UDM 608 and then provides the appropriate policy rules to the control plane functions so that they can enforce them. The SCP (not shown) provides a highly distributed multi-access edge compute cloud environment and a single point of entry for a cluster of NFs once they have been successfully discovered by the NRF 624. This allows the SCP to become the delegated discovery point in a datacenter, off-loading the NRF 624 from distributed service meshes that make up a network operator's infrastructure. Together with the NRF 624, the SCP forms the hierarchical 5G service mesh.

The AMF 610 receives requests and handles connection and mobility management while forwarding session management requirements over the N11 interface to the SMF 614. The AMF 610 determines that the SMF 614 is best suited to handle the connection request by querying the NRF 624. That interface and the N11 interface between the AMF 610 and the SMF 614 assigned by the NRF 624 use the SBI 621. During session establishment or modification, the SMF 614 also interacts with the PCF 612 over the N7 interface and the subscriber profile information stored within the UDM 608. Employing the SBI 621, the PCF 612 provides the foundation of the policy framework that, along with the more typical QoS and charging rules, includes network slice selection, which is regulated by the NSSF 626.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not for other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A system for automated bulk modification of Kubernetes cluster configurations, the system comprising:

at least one hardware processor; and at least one non-transitory memory storing instructions, which, when executed by the at least one hardware processor, cause the system to:

receive, from an administrator device, a cluster modification request including an indication of target clusters and a set of modification indicators, wherein the indication of the target clusters includes an indication of a particular function of a telecommunication network, and wherein each modification indicator in the set of modification indicators indicates an update to a cluster component property;

identify a set of cluster identifiers using the received indication of target clusters, wherein each cluster identifier of the set of cluster identifiers specifies a corresponding cluster associated with the particular function of the telecommunication network; and for each particular cluster identifier in the set of cluster identifiers:

retrieve, for the particular cluster identifier corresponding to a particular cluster associated with the particular function of the telecommunication network, an associated repository identifier, an associated configuration file, and associated cluster configuration data, generate, using the retrieved configuration file, a modified configuration file based on the set of modification indicators and the retrieved cluster configuration data, store the modified configuration file in a repository associated with the retrieved repository identifier, and transmit a request to the repository to modify an existing control plane node configuration of a target cluster, wherein the request enables the repository to generate a modified control plane node configuration of the target cluster using the modified configuration file.

2. The system of claim 1, wherein the instructions for generating the modified configuration file cause the system to:

identify an element field of the retrieved configuration file;

determine, for the particular cluster identifier, an element associated with the element field; and modify the retrieved configuration file to populate the element field with the element to generate the modified configuration file.

3. The system of claim 2, wherein the instructions for determining the element, for the particular cluster identifier, cause the system to:

determine, within the retrieved cluster configuration data for the particular cluster identifier, a configuration field associated with a version identifier, a file path, a resource identifier, or a client system identifier; and generate the element to include a value that is associated with the configuration field.

4. The system of claim 1, wherein the instructions cause the system to:

receive, from the administrator device, a revert request for the cluster modification request;

determine that clusters associated with the set of cluster identifiers are associated with the cluster modification request; and in response to the revert request, for each particular cluster identifier in the set of cluster identifiers, transmit a request to the repository linked to the particular cluster identifier to revert the modified control plane node configuration to the existing control plane node configuration.

5. The system of claim 1, wherein the instructions for identifying the set of cluster identifiers using the received indication of target clusters cause the system to:

determine that the indication of target clusters includes an indication of a cloud, a region, an environment, or a subscription;

determine a cluster grouping based on the indication of target clusters; and identify, using a cluster database, the set of cluster identifiers, wherein each cluster identifier of the set of cluster identifiers is associated with the cluster grouping.

6. The system of claim 1, wherein the instructions cause the system to:

receive, from the administrator device and for each particular cluster identifier in the set of cluster identifiers, a configuration history request including the particular cluster identifier;

transmit a request for a configuration file history to the repository associated with the retrieved repository identifier;

receive, from the repository, a set of previous configuration files and associated timestamps, wherein the set of previous configuration files includes the modified configuration file; and transmit, to the administrator device, the set of previous configuration files and the associated timestamps.

7. The system of claim 1, wherein the instructions for generating, for the particular cluster identifier, the modified control plane node configuration using the modified configuration file cause the system to:

generate an updated operating system image based on the modified configuration file; and replace, for the target cluster, an operating system image with the updated operating system image.

8. A non-transitory, computer-readable storage medium comprising instructions recorded thereon, wherein the instructions when executed by at least one data processor of a system, cause the system to:

receive, from an administrator device, a cluster modification request including an indication of target clusters and a set of modification indicators, wherein the indication of target clusters includes an indication of a particular function of a telecommunication network, and wherein each modification indicator in the set of modification indicators indicates an update to a cluster component property;

identify a set of cluster identifiers using the received indication of target clusters, wherein each cluster identifier of the set of cluster identifiers specifies a corresponding cluster associated with the particular function of the telecommunication network; and for each particular cluster identifier in the set of cluster identifiers:

retrieve, for the particular cluster identifier corresponding to a particular cluster associated with the particular function of the telecommunication network, an associated repository identifier, an associated configuration file, and associated cluster configuration data, generate, using the retrieved configuration file, a modified configuration file based on the set of modification indicators and the retrieved cluster configuration data, store the modified configuration file in a repository associated with the retrieved repository identifier, and transmit a request to the repository to modify an existing control plane node configuration of a target cluster, wherein the request enables the repository to generate a modified control plane node configuration of the target cluster using the modified configuration file.

9. The non-transitory, computer-readable storage medium of claim 8, wherein the instructions for generating the modified configuration file cause the system to:

identify an element field of the retrieved configuration file;

determine, for the particular cluster identifier, an element associated with the element field; and modify the retrieved configuration file to populate the element field with the element to generate the modified configuration file.

10. The non-transitory, computer-readable storage medium of claim 9, wherein the instructions for determining the element, for the particular cluster identifier, cause the system to:

determine, within the retrieved cluster configuration data for the particular cluster identifier, a configuration field associated with a version identifier, a file path, a resource identifier, or a client system identifier; and generate the element to include a value that is associated with the configuration field.

11. The non-transitory, computer-readable storage medium of claim 8, wherein the instructions cause the system to:

receive, from the administrator device, a revert request for the cluster modification request;

determine that clusters associated with the set of cluster identifiers are associated with the cluster modification request; and in response to the revert request, for each particular cluster identifier in the set of cluster identifiers, transmit a request to the repository linked to the particular cluster identifier to revert the modified control plane node configuration to the existing control plane node configuration.

12. The non-transitory, computer-readable storage medium of claim 8, wherein the instructions for identifying the set of cluster identifiers using the received indication of target clusters cause the system to:

determine that the indication of target clusters includes an indication of a cloud, a region, an environment, or a subscription;

determine a cluster grouping based on the indication of target clusters; and identify, using a cluster database, the set of cluster identifiers, wherein each cluster identifier of the set of cluster identifiers is associated with the cluster grouping.

13. The non-transitory, computer-readable storage medium of claim 8, wherein the instructions cause the system to:

receive, from the administrator device and for each particular cluster identifier in the set of cluster identifiers, a configuration history request including the particular cluster identifier;

transmit a request for a configuration file history to the repository associated with the retrieved repository identifier;

receive, from the repository, a set of previous configuration files and associated timestamps, wherein the set of previous configuration files includes the modified configuration file; and transmit, to the administrator device, the set of previous configuration files and the associated timestamps.

14. The non-transitory, computer-readable storage medium of claim 8, wherein the instructions for generating the modified control plane node configuration using the modified configuration file cause the system to:

generate an updated operating system image based on the modified configuration file; and replace, for the target cluster, an operating system image with the updated operating system image.

15. A method comprising:

receiving, from an administrator device, a cluster modification request including an indication of target clusters and a set of modification indicators, wherein the indication of the target clusters includes an indication of a particular function of a telecommunication network, and wherein each modification indicator in the set of modification indicators indicates an update to a cluster component property;

identifying a set of cluster identifiers using the received indication of target clusters, wherein each cluster identifier of the set of cluster identifiers specifies a corresponding cluster associated with the particular function of the telecommunication network; and for each particular cluster identifier in the set of cluster identifiers:

identifying, for the particular cluster identifier corresponding to a particular cluster associated with the particular function of the telecommunication network, an associated repository identifier, an associated configuration file, and associated cluster configuration data, generating, using the identified configuration file, a modified configuration file based on the set of modification indicators and the identified cluster configuration data, storing the modified configuration file in a repository associated with the identified repository identifier, and transmitting a request to the repository to modify an existing control plane node configuration of a target cluster, wherein the request enables the repository to generate a modified control plane node configuration of the target cluster using the modified configuration file.

16. The method of claim 15, wherein generating the modified configuration file for each particular cluster identifier in the set of cluster identifiers comprises:

identifying an element field of the identified configuration file;

determining, for the particular cluster identifier, an element associated with the element field; and modifying the identified configuration file to populate the element field with the element to generate the modified configuration file.

17. The method of claim 16, wherein determining the element, for the particular cluster identifier, comprises:

determining, within the identified cluster configuration data for the particular cluster identifier, a configuration field associated with a version identifier, a file path, a resource identifier, or a client system identifier; and generating the element to include a value that is associated with the configuration field.

18. The method of claim 15, comprising:

receiving, from the administrator device, a revert request for the cluster modification request;

determining that clusters associated with the set of cluster identifiers are associated with the cluster modification request; and in response to the revert request, for each particular cluster identifier in the set of cluster identifiers, transmitting a request to the repository linked to the particular cluster identifier to revert the modified control plane node configuration to the existing control plane node configuration.

19. The method of claim 16, wherein identifying the set of cluster identifiers using the received indication of target clusters comprises:

determining that the indication of target clusters includes an indication of a cloud, a region, an environment, or a subscription;

determining a cluster grouping based on the indication of target clusters; and identifying, using a cluster database, the set of cluster identifiers, wherein each cluster identifier of the set of cluster identifiers is associated with the cluster grouping.

20. The method of claim 16, comprising:

receiving, from the administrator device and for each particular cluster identifier in the set of cluster identifiers, a configuration history request including the particular cluster identifier;

transmitting a request for a configuration file history to the repository associated with the identified repository identifier;

receiving, from the repository, a set of previous configu-
ration files and associated timestamps,
  wherein the set of previous configuration files includes
    the modified configuration file; and
transmitting, to the administrator device, the set of pre-
vious configuration files and the associated timestamps.

* * * * *